United States Patent
Chau

(10) Patent No.: US 11,062,289 B2
(45) Date of Patent: Jul. 13, 2021

(54) POINT OF SALE TERMINAL WITH BREAKAWAY CABLE

(71) Applicant: Wunchun Chau, Jacksonville, FL (US)

(72) Inventor: Wunchun Chau, Jacksonville, FL (US)

(*) Notice: Subject to any disclaimer, the term of this patent is extended or adjusted under 35 U.S.C. 154(b) by 228 days.

(21) Appl. No.: 15/639,708

(22) Filed: Jun. 30, 2017

(65) Prior Publication Data

US 2018/0012212 A1    Jan. 11, 2018

Related U.S. Application Data

(60) Provisional application No. 62/360,906, filed on Jul. 11, 2016.

(51) Int. Cl.
| | | |
|---|---|---|
| *G06Q 20/20* | (2012.01) | |
| *G07F 7/10* | (2006.01) | |
| *G07F 7/08* | (2006.01) | |

(52) U.S. Cl.
CPC ........... *G06Q 20/204* (2013.01); *G06Q 20/20* (2013.01); *G06Q 20/202* (2013.01); *G07F 7/0886* (2013.01); *G07F 7/1033* (2013.01)

(58) Field of Classification Search
None
See application file for complete search history.

(56) References Cited

U.S. PATENT DOCUMENTS

| | | | |
|---|---|---|---|
| 2013/0299574 A1* | 11/2013 | Theobald | G06Q 20/34 235/380 |
| 2018/0005230 A1* | 1/2018 | Zovi | G06Q 20/401 |
| 2018/0005243 A1* | 1/2018 | Zovi | G06Q 20/4016 |
| 2018/0204198 A1* | 7/2018 | Lin | G06Q 20/202 |
| 2018/0268408 A1* | 9/2018 | Botros | G06Q 20/4012 |
| 2018/0276666 A1* | 9/2018 | Haldenby | G06Q 20/401 |

OTHER PUBLICATIONS

VeriFone, Inc., VX805 CTLS Installation Guide, 2012, VeriFone Part No. DOC280-023-EN-A, Revision A.7, pp. 1-35 (Year: 2012).*

* cited by examiner

*Primary Examiner* — Fateh M Obaid

(57) ABSTRACT

A handheld POS terminal is provided, which is wired to a secure base unit by a cable consisting of two pieces that are joined together by a plug-in connector. The plug-in connector has a pull-out force necessary to separate the connector that is greater than the weight of the POS terminal but less than the force necessary to damage the cable connections at the POS terminal or at the base unit. The cable may also include a coiled section, which acts as a spring, so that if the POS terminal is dropped, the coiled section brings the POS terminal gently to a stop before it hits the ground. If a customer drives away with the POS terminal still in the car, the cable will separate at the plug-in connector, preventing damage to the POS terminal.

8 Claims, 5 Drawing Sheets

POINT OF SALE TERMINAL WITH BREAKAWAY CABLE

BACKGROUND OF THE INVENTION

This invention relates generally to Point of Sale (POS) terminals and, in particular, to handheld POS terminals.

Prior to the development of POS terminals, merchants wishing to accept credit card payments were obliged to engage in a cumbersome process that involved taking an imprint of the customer's credit card information on a paper credit card slip then depositing the paper credit card slips copies with the merchant's bank for processing. In the late 1970's, VISA® introduced the first POS terminal, which was a terminal that could read credit card information from a band of magnetic material imbedded in the credit card, then instantly transmit the information to the issuing bank for verification. Use of a POS terminal to directly capture credit card information instead of imprinting or manually entering card details enable merchants to benefit from the efficiency of decreased transaction processing time. As a consequence of this added efficiency, POS terminals have become ubiquitous in the retail and food service industries.

As more and more transactions are processed using credit cards (as used herein "credit card" is intended to broadly include credit cards, debit cards, electronic benefit cards and similar forms of payment in which a magnetic stripe or chip is read by the merchant system), greater emphasis is being placed on securing the transaction to prevent theft of cardholder data and to prevent fraudulent use of stolen credit card data. Recently, Europay Mastercard and Visa have introduced a standard that requires the POS terminal to have the capability to read a chip embedded in the card, either by inserting the chip card into the POS terminal or to hold the card near enough to the POS terminal for the chip to be read by some form of near field communication (e.g. RFID or Bluetooth). Depending on the authorization method, a signature or Personal Identification Number (PIN) must be entered by the customer on the POS terminal. Similar methods of securing the transaction are required by contactless payment methods, such as Applepay®, Samsung Pay and other smart phone systems.

Requirement that the user enter a PIN or that the user's cell phone be placed in close proximity to the POS terminal presents special challenges for the processing transactions in the drive-through lanes of fast food restaurants and other drive-through transactions. For credit card transactions, requiring the consumer to provide their PIN to the store employee is unacceptable as it presents significant security risks to the consumer. For contactless payments, most customers are unwilling to surrender their smart phone to the store employee as was common for magnetic stripe credit card transactions. Thus, in order to accept electronic payments, the retailer is faced with the prospect of mounting a payment terminal on the outside of the service window, where it is subject to damage from weather and vandalism, or the high risk of breakage when a handheld wireless payment terminal is passed through the service window to a customer in their car to process each transaction.

SUMMARY OF THE INVENTION

The present invention solves the foregoing problem by providing a handheld POS terminal that is wired to a secure base unit. In an illustrative embodiment, the cable from the POS terminal to the secure base is in two pieces that are joined together by a plug-in connector. The plug-in connector has a pull-out force necessary to separate the connector that is greater than the weight of the POS terminal but less than the force necessary to damage the cable connections at the POS terminal or at the base unit. The illustrative cable also includes a coiled section, which acts as a spring. If the POS terminal is dropped, the coiled section brings the POS terminal gently to a stop before it hits the ground. If a customer drives away with the POS terminal still in the car, the cable will separate at the plug-in connector, preventing damage to the POS terminal. In an alternative embodiment, the POS terminal has an alarm and/or a GPS tracker that is activated if the plug-in connector is separated.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
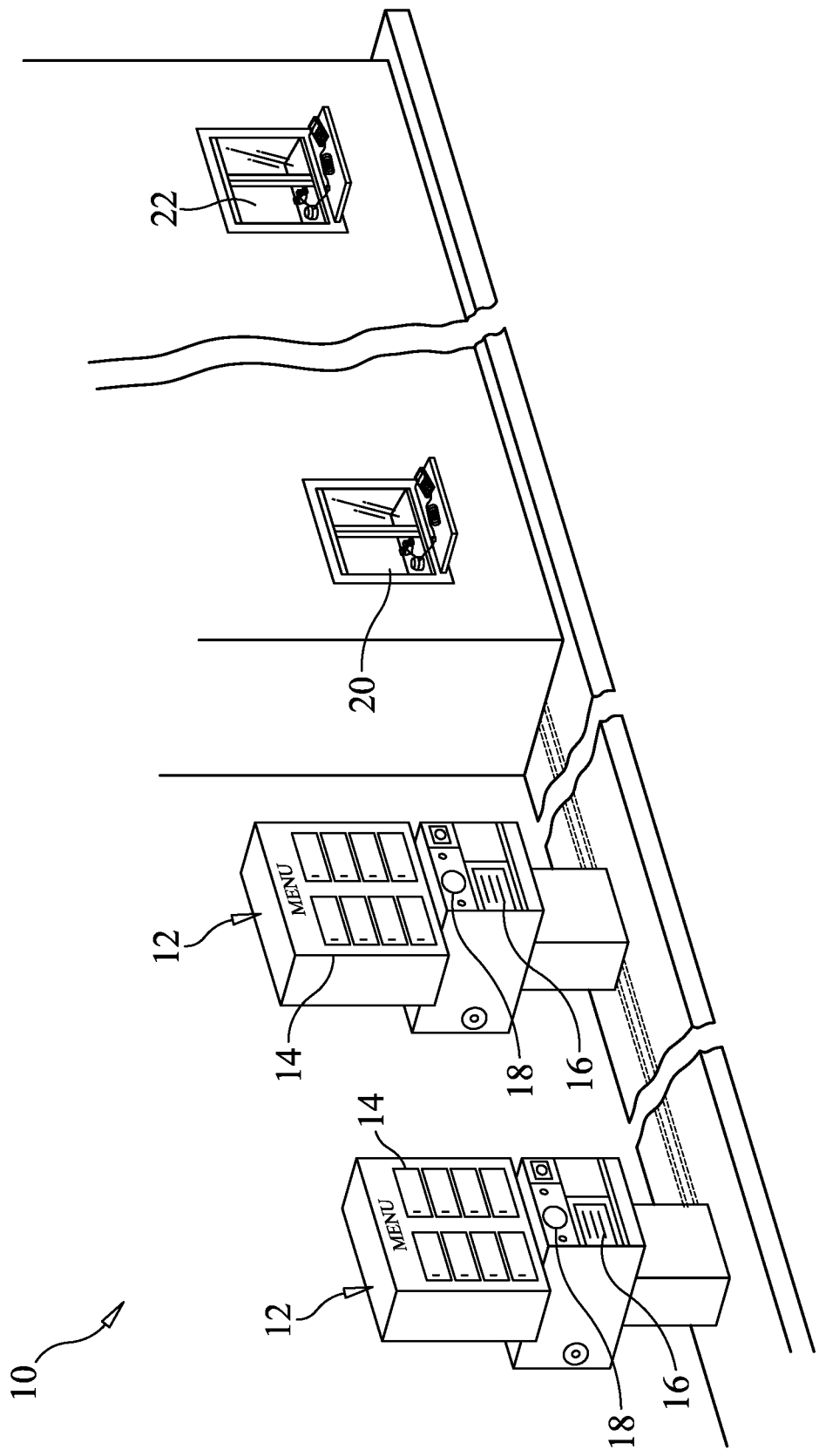
FIG. 1 is a partial perspective view of a drive-through food service lane with POS terminals incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to the figures and, in particular FIG. 1, a drive-through food service lane 10 conventionally comprises a plurality of kiosks 12 displaying a selection of menu items 14. Kiosk 12 conventionally includes a microphone 16 and a speaker 18 to enable a customer to communicate with the order taker to place a food order. The customer typically advances either to a payment window 20 or a payment and service window 22 where payment is made.

Figure 2:
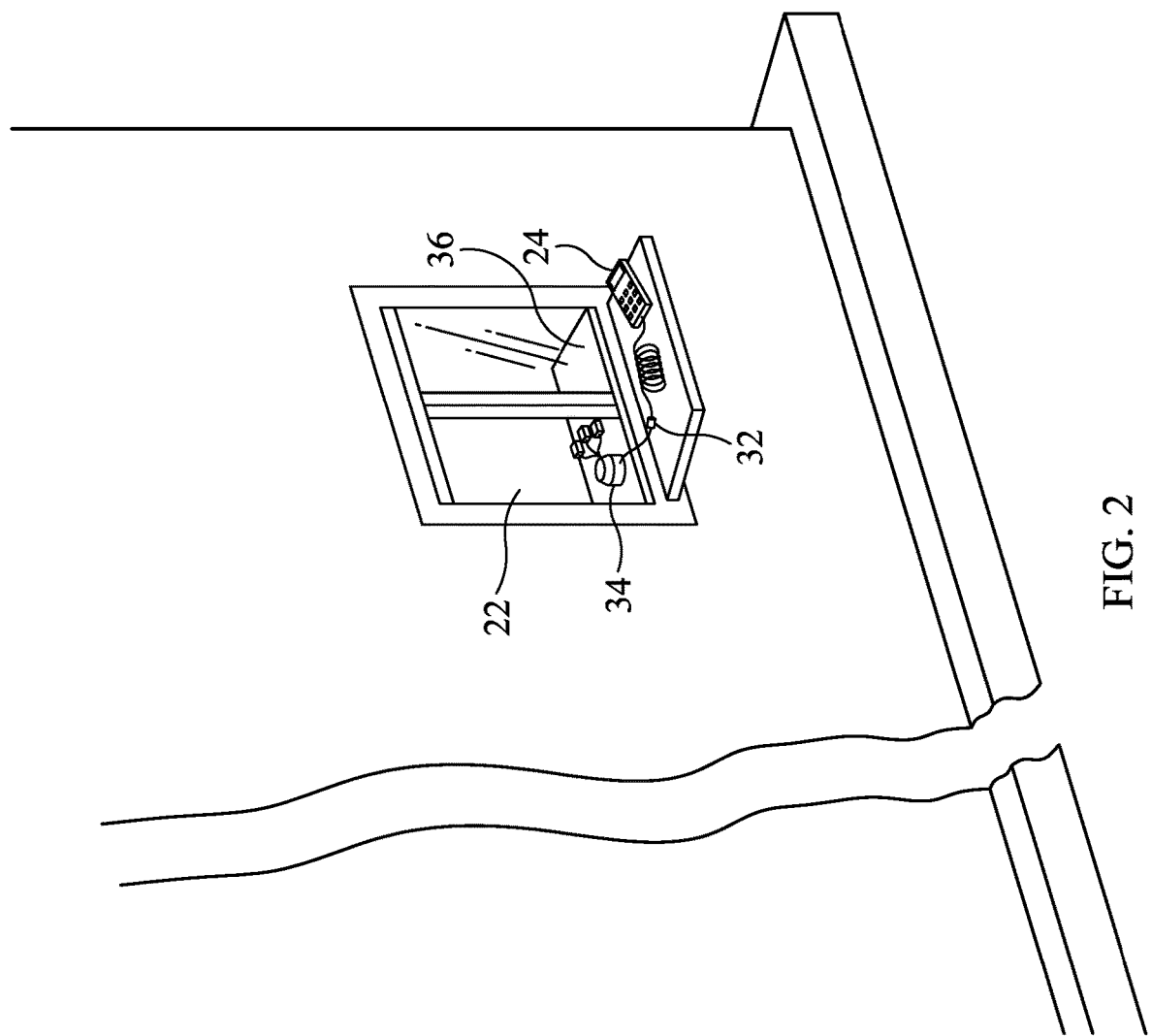
FIG. 2 is an enlarged perspective view of one of the service windows of FIG. 1 with the POS terminal in its inactive position.

With additional reference to FIG. 2, in accordance with the present invention, payment and service window 22 is equipped with a handheld POS terminal 24, which includes a credit card chip reader, magnetic strip reader, RFID, Bluetooth, near field magnetic or other communication device to allow the POS terminal to interface with a credit card, smart phone or other contact or non-contact payment device. POS terminal 24 also includes a signature capture screen and keypad for inputting the customer's signature and/or PIN for the purpose of credit card verification.

Figure 3:
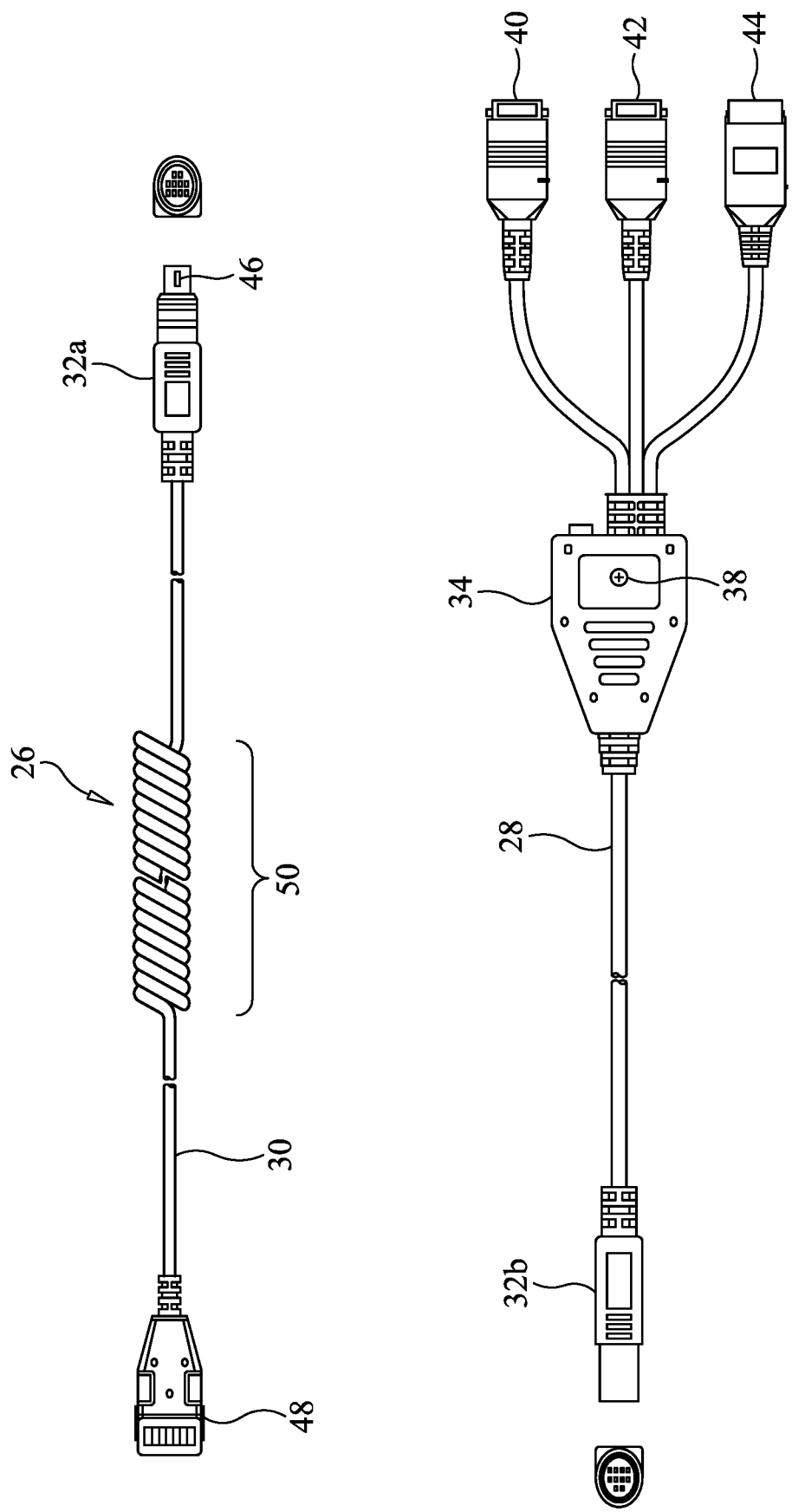
FIG. 3 is a plan view of a cable system incorporating features of the present invention.

With additional reference to FIG. 3, POS terminal 24 communicates with the merchant's payment processing system by means of cable system 26 which is composed of a first section 28 and a second section 30 joined together by a plug-in connector 32. First section 28 includes a base unit 34 which is adapted to be attached to a counter, wall, or other suitable surface inside of payment and service window 22. In the illustrative embodiment, base unit 34 is attached to the counter 36 of payment and service window 22 by means of a screw passing through an aperture 38 formed in base unit 34. First section 28 includes a plurality of connectors 40, 42, 44 to allow POS terminal 24 to communicate with a variety of payment processing systems.

Plug-in connector 32 is composed of a male portion 32a and a female portion 32b which, when joined together provide the necessary data links between POS terminal 24 and the merchant's payment processing system. When assembled, plug-in connector 32 is held together by means of a snap ring 46 which provides a predetermined pull-out force necessary to separate plug-in connector 32. This predetermined pull-out force is substantially less than the force necessary to damage cable system 26 (e.g. by causing a cable separation at base unit 34 or at POS terminal connector 48. Preferably the predetermined pull-out force is less than half the force necessary to damage cable system 26, preferably 10% or less than force necessary to damage cable system 26. The predetermined pull-out force is, however, also greater than the weight of POS terminal 24 for reasons that will become apparent hereinafter. In the illustrative embodiment, POS terminal 24 has a mass of 300 g and the pull-out force necessary to separate plug-in connector 32 is from 110 N to 135 N (11-13 Kgf) or about 40 times the weight of POS terminal 24.

Figure 4:
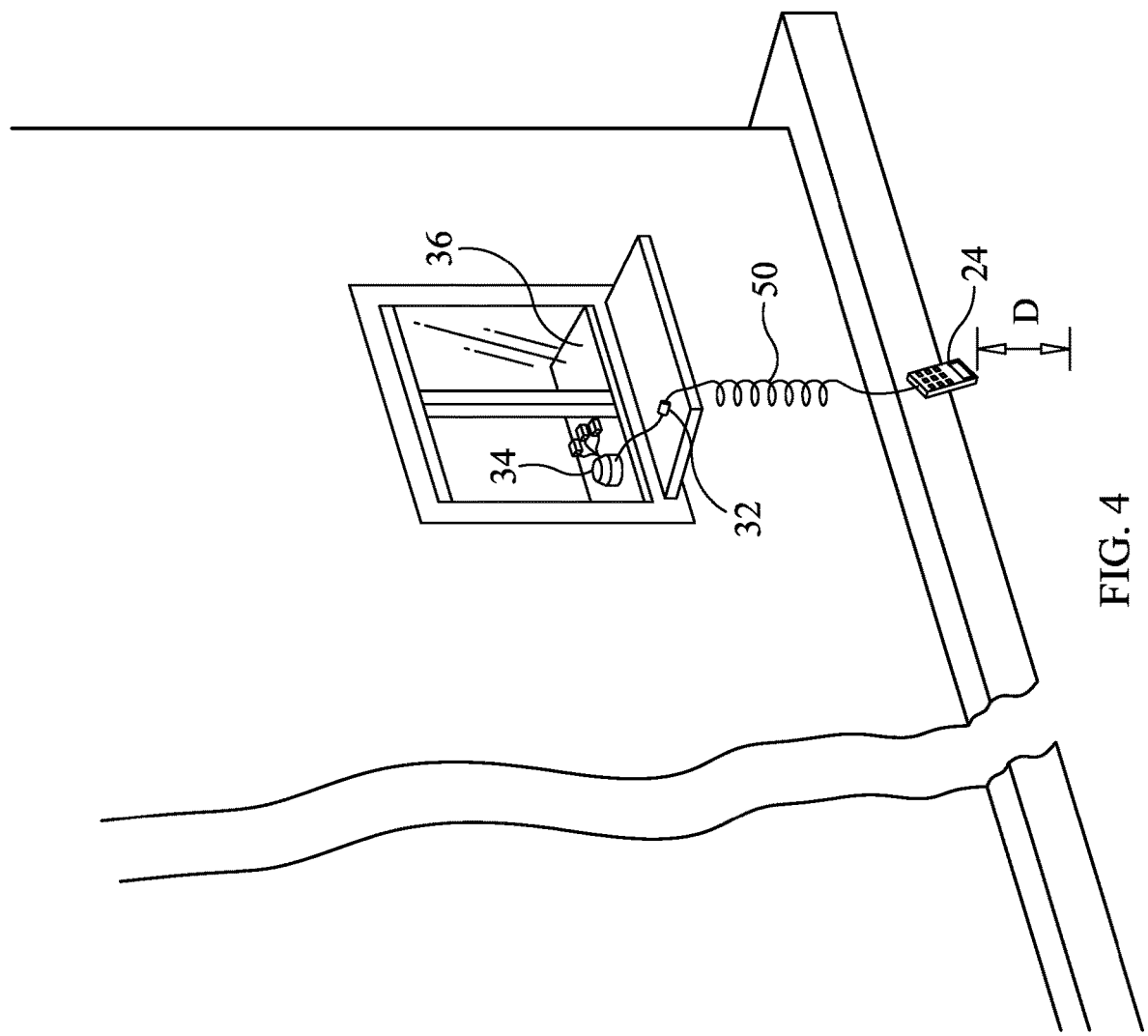
FIG. 4 is a perspective view of the service window of FIG. 3, with the POS terminal suspended by the cable system of FIG. 3.

Second section 30 of cable system 26 includes an elastic portion 50, having a predetermined length and a predetermined spring rate. In the illustrative embodiment, elastic portion 50 comprises a coiled section of cable. Elastic portion 50 is optimized to bring POS terminal 24 to a gentle stop above the pavement surface in the event POS terminal 24 is dropped. For example, as shown in FIG. 4, as shown in FIG. 4, in the illustrative embodiment the spring rate of elastic portion 50 is 3 kg per meter. In the event POS terminal 24 is dropped, the cable will exert a force of 300 g when extended to a length of 450 mm which is sufficient to suspend POS terminal 24 a distance "D" approximately 300 mm above the surface of the pavement, thereby preventing POS terminal 24 from impacting the hard pavement.

Figure 5:
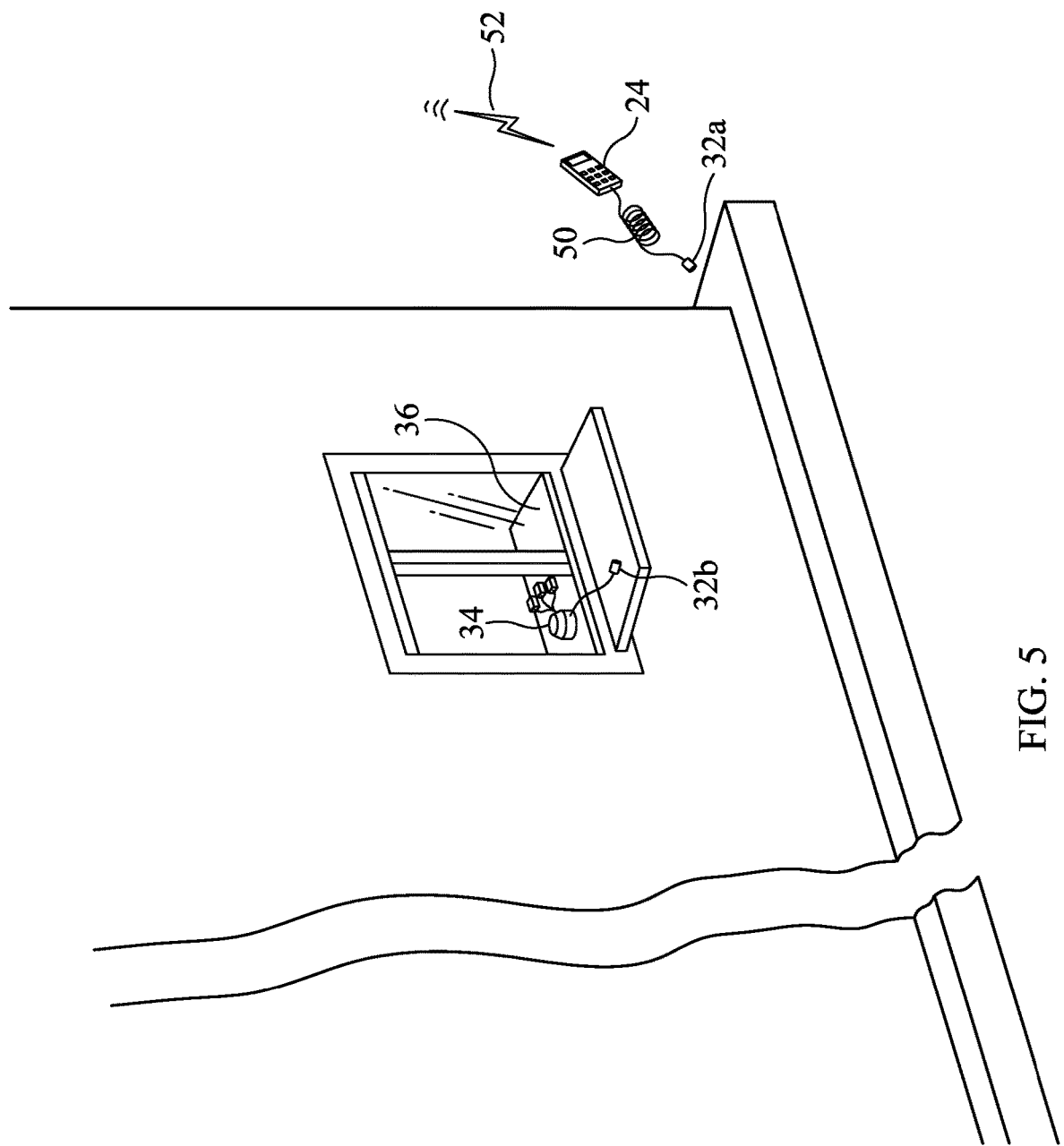
FIG. 5 is a perspective view of the service window of FIG. 3, with the cable system of FIG. 3 disconnected at the plug-in connector.

With additional reference to FIG. 5, in the event a customer drives away with POS terminal 24 still in the vehicle, the pull-out force necessary to separate plug-in connector 32 will be exceeded and plug-in connector 32 will separate before any damage to cable system 26 or POS terminal 24 can occur. Software running on POS terminal 24 detects the loss of signal and sounds an alarm 52 to alert the customer that POS terminal 24 is still in the vehicle. Additionally, when the loss of signal is detected, POS terminal 24 may activate a GPS tracking device so that POS terminal 24 can be recovered.

Although certain illustrative embodiments and methods have been disclosed herein, it will be apparent from the foregoing disclosure to those skilled in the art that variations and modifications of such embodiments and methods may be made without departing from the invention. For example, although in the illustrative embodiment elastic portion 50 is part of second section 30 of cable system 26, elastic section 50 may be incorporated into first section 28 in addition to or instead of second section 30. Accordingly, it is intended that the invention should be limited only to the extent required by the appended claims and the rules and principles of applicable law. Additionally, as used herein, references to direction such as "up" or "down" as well as recited materials or methods of attachment are intended to be exemplary and are not considered as limiting the invention and, unless otherwise specifically defined, the terms "generally," "substantially," or "approximately" when used with mathematical concepts or measurements mean within ±10 degrees of angle or within 10 percent of the measurement, whichever is greater. As used herein, a step of "providing" a structural element recited in a method claim means and includes obtaining, fabricating, purchasing, acquiring or otherwise gaining access to the structural element for performing the steps of the method. As used herein, the claim terms are to be given their broadest reasonable meaning unless a clear disavowal of that meaning appears in the record in substantially the following form ("As used herein the term _____ is defined to mean _____")

What is claimed is:

1. In combination with a hand-held Point of Sale (POS) terminal comprising at least one of a chip reader and a near field communication device for reading a user's credit card information, a data cable system comprising:
   a base unit adapted to be rigidly mounting to a surface; and
   a data cable attached between the POS terminal and the base unit, the data cable comprising first and second sections, the first and second sections each having a predetermined breaking strength, the first section comprising an elastic region having a predetermined length and a predetermined effective spring rate, the first and second sections being joined together by a separable connector, the connector having a predetermined pull-out force that is less than each of the predetermined breaking strengths of the first and second sections.

2. The combination of claim 1, wherein the POS terminal has a predetermined weight, wherein the base unit is mounted at a predetermined mounting height above a ground surface and wherein the elastic region of the data cable has a spring rate sufficient to support the predetermined weight of the POS terminal when the data cable is extended to a length that is less than the predetermined mounting height.

3. The combination of claim 1, wherein the elastic region comprises a coiled section of cable having a spring rate of between 1 kilogram per meter and 9 kilograms per meter.

4. The combination of claim 1, wherein:
   the pull-out force of the connector is less than half of the of the predetermined breaking strengths of the first and second sections.

5. The combination of claim 1, wherein the POS terminal further comprises a GPS tracker that is activated when the pull-out force of the connector is exceeded thereby causing the connector to separate.

6. The combination of claim 1, wherein the first section is attached to the base unit.

7. The combination of claim 1, wherein the first section is attached to the base POS terminal.

8. In combination with a hand-held Point of Sale (POS) terminal comprising at least one of a chip reader and a near field communication device for reading a user's credit card information, a data cable system comprising:
   a base unit capable of transmitting credit card information to an issuing bank, the base unit adapted to be rigidly mounting to a surface; and
   a data cable attached between the POS terminal and the base unit, the data cable comprising first and second sections, the first and second sections each having a predetermined breaking strength, the first section comprising an elastic region having a predetermined length and a predetermined effective spring rate, the first and second sections being joined together by a separable connector, the connector having a predetermined pull-out force that is less than each of the predetermined breaking strengths of the first and second sections.

\* \* \* \* \*